United States Patent

[11] 3,624,145

| [72] | Inventor | Marvin S. Brinn |
| | | Wilmington, Del. |
| [21] | Appl. No. | 799,986 |
| [22] | Filed | Feb. 17, 1969 |
| [73] | Assignee | E. I. du Pont de Nemours and Company |
| | | Wilmington, Del. |

[54] PURIFICATION OF TEREPHTHALIC ACID BY LIQUID-LIQUID EXTRACTION
8 Claims, No Drawings

| [52] | U.S. Cl. | 260/525 |
| [51] | Int. Cl. | C07c 51/48 |
| [50] | Field of Search | 260/525 |

[56] References Cited
UNITED STATES PATENTS

| 2,572,710 | 10/1951 | Emerson et al. | 260/525 |
| 3,020,312 | 2/1962 | Moscrip | 260/524 |
| 3,072,717 | 1/1963 | Pritchett et al. | 260/524 |

FOREIGN PATENTS

| 768,189 | 9/1967 | Canada | |

OTHER REFERENCES

Weissberger, ed., Technique of Organic Chemistry," Part I. Separation and Purification," 1956, p. 237.

Primary Examiner—Lorraine A. Weinberger
Assistant Examiner—R. S. Weissberg
Attorney—James J. Flynn ABSTRACT: Purifying terephthalic acid by liquid-liquid extraction wherein an aqueous solution of crude terephthalic acid is contacted with a water-immiscible liquid organic extractant inert to terephthalic acid at elevated temperatures to form an aqueous phase and organic phase, subsequently separating the two phases and recovering purified terephthalic acid.

PURIFICATION OF TEREPHTHALIC ACID BY LIQUID-LIQUID EXTRACTION

BACKGROUND OF THE INVENTION

This invention relates to a process for purifying terephthalic acid and, more particularly, purifying terephthalic acid by a liquid-liquid extraction process.

Terephthalic acid is used in large quantities as a starting material for the preparation of polyester fibers such as linear polyalkylene terephthalates. These polyesters can be prepared quite conveniently by, for example, direct condensation of ethylene glycol with terephthalic acid. In such processes the terephthalic acid used in fiber production must be of exceptionally high purity. However, terephthalic acid prepared by, for example, the oxidation of p-xylene contains oxidation intermediates as impurities. These intermediates must be removed from the acid to obtain a material suitable for use in making polyester fibers. A number of methods have been employed for purifying terephthalic acid by chemical or physical treatment to obtain an acid suitable for fiber production. For example, Canadian Pat. No. 768,189 discloses isolating pure terephthalic acid from an oxidation mixture by heating the oxidate at 210° to 280° C. for about ½ to 5 hours and recovering the purified terephthalic acid. Furthermore, p-xylene has been used to remove impurities from terephthalic acid but these methods have been digestion procedures with all their attendant disadvantages. None of the methods heretofore known is completely satisfactory because they are either economically prohibitive or sufficient amounts of impurities are not removed from the terephthalic acid.

SUMMARY OF THE INVENTION

It has been discovered that impurities can be removed from crude terephthalic acid by a certain liquid-liquid extraction process. The process involves contacting an aqueous solution of crude terephthalic acid containing a weight ratio of acid to water of about from 1:1 to 1:60 with a water-immiscible liquid organic extractant inert to terephthalic acid at a temperature within the range of about from 200° to 320° C., preferably 220° to 280° C., thereby forming a two-phase system of an aqueous phase containing purified terephthalic acid and an organic phase containing impurities extracted from the aqueous solution of crude terephthalic acid, said extractant added in an amount sufficient to produce a ratio of aqueous phase to organic phase of 1:0.5 to 1:20, segregating the organic phase containing impurities from the aqueous phase containing terephthalic acid and recovering purified terephthalic acid from the aqueous phase. This liquid-liquid extraction procedure can be, and usually is, repeated until terephthalic acid of the desired purity is obtained from the appropriate number of stages. It is essential that relatively large quantities of water in relation to terephthalic acid is present in the extraction process so that the ratio of terephthalic acid to water is as defined above and, during extraction, while the acid is in solution, the ratio of aqueous phase to organic phase must be within the limits defined above. Thus, the invention is directed to a liquid-liquid extraction process for removing impurities from an aqueous solution of terephthalic acid with a water-immiscible liquid organic extractant. Following the procedure of the present invention provides a process for making substantially pure, fiber grade terephthalic acid easily and economically.

PREFERRED EMBODIMENTS OF THE INVENTION

Crude terephthalic acid obtained from the oxidation of p-xylene with molecular oxygen contains certain impurities, primarily p-tolualdehyde, p-formylbenzoic acid, p-toluic acid, and lesser amounts of other partial oxidation products that are also extremely difficult to remove. According to the present invention, a solution of crude terephthalic acid containing a weight ratio of acid to water of from 1:1 to 1:60, and preferably 1:2 to 1:10, is mixed with a water-immiscible liquid extractant at a temperature of about from 200° to 320° C., preferably 220° to 280° C. thereby forming a two-phase system of an aqueous phase containing terephthalic acid and an organic phase containing impurities extracted from the aqueous solution of crude terephthalic acid, said extractant added in an amount to produce a ratio of aqueous phase to organic phase of from 1:0.5 to 1:20, and preferably 1:1 to 1:5, segregating the aqueous phase from the organic phase by, for example, settling, separating the organic phase containing impurities from the aqueous phase containing terephthalic acid, and recovering purified terephthalic acid from the aqueous phase. Important features for the successful operation of this process are the weight ratio of crude terephthalic acid to water, the ratio of aqueous to organic phase, and the temperature maintained during extraction of the impurities. The process must be conducted under such conditions that impurities are extracted from an aqueous solution of terephthalic acid as contrasted to removal of impurities from solid terephthalic acid, i.e. digestion procedures.

The primary constituent of the organic phase that solvates the impurities in the liquid-liquid extraction process is the extractant. Any water-immiscible liquid organic compound that is inert to terephthalic acid can be used as the extractant in the process of the invention. Although any organic solvent can be used in the process, provided, of course, it is inert to terephthalic acid, preferably the extractant is an aromatic hydrocarbon, especially those having six to nine carbon atoms. Representative extractants include benzene, xylene, chlorobenzene, nitrobenzene, mixed xylenes, butyl acetate and mixtures thereof. Preferably the most effective solvent from an economic and operative standpoint that is used in the process is p-xylene. The water-immiscible liquid organic extractant and the aqueous solution of terephthalic acid when mixed in a single vessel in a batch process, or a series of mixers and settlers arranged to effect a countercurrent type extraction, or a continuous countercurrent flow through a single column, form at the temperatures stated above, an aqueous phase and an organic phase. Initially, the aqueous phase contains primarily terephthalic acid and impurities; whereas the organic phase contains primarily the liquid organic extractant that is inert to terephthalic acid. However, after mixing the aqueous phase and the organic phase, the organic extractant solvates and removes impurities, primarily p-tolualdehyde and p-formylbenzoic acid, from the crude aqueous solution of terephthalic acid. The amount of time for extraction treatment depends upon the particular procedure used and, of course, the amounts of ingredients treated. In general, a multiple stage batch process in which the organic phase and aqueous phase are mixed by mechanical agitation and allowed to settle, or a continuous process employing a series of mixers and settlers of the type used in cocurrent or countercurrent extraction systems, require about 1 to 60, and usually 5 to 30, minutes from mixing until extraction is complete and purified terephthalic acid recovered.

After the organic extractant has solvated and removed the impurities from the aqueous solution of terephthalic acid, the organic phase containing impurities and the aqueous phase containing terephthalic acid are segregated, most conveniently by gravitational settling. After the phases are segregated, for example, by settling in a tank, the two phases are separated by any suitable means, e.g., decantation, centrifugation or the like. The aqueous phase containing purified terephthalic acid is treated to remove water from the acid by any suitable means, for example, filtration, or centrifugation. Usually, and preferably, the aqueous phase is cooled, e.g., to ambient temperature to less than about 180° C., prior to removal of the purified terephthalic acid from the water.

The application of pressure is not necessary for the successful operation of the process except that pressure should be sufficiently high during the extraction step, where temperatures of from 200° to 320° C. are employed, that the ingredients are safely contained and the ingredients, e.g., the organic extractant, remain in the liquid phase. The present process can be conducted under substantially autogenous pressure, but pressures slightly above about autogenous pressure are desired in order to prevent the loss of ingredients.

The following examples further illustrate the invention but are not to be considered as limiting the teachings of the invention.

EXAMPLE 1

Ten grams of crude terephthalic acid, containing 0.18 g. (1.8 percent) of impurities, i.e. p-tolualdehyde and p-formylbenzoic acid, was made from the oxidation of p-xylene with molecular oxygen and mixed with 45 g. of water, to produce a weight ratio of acid to water of 1 to 4.5. Forty-five grams of the extractant p-xylene is added to the now aqueous solution of terephthalic acid, thus forming an aqueous phase and organic phase wherein the weight ratio of aqueous terephthalic acid to water-immiscible liquid extractant is 1 to 0.82. The charge is sealed in the autoclave and heated to 250° C. with vigorous agitation in order to insure intimate mixing of the aqueous phase and organic phase to permit extraction of impurities from the aqueous phase to the organic phase. The agitation was stopped after about 5 minutes and the organic and aqueous phases were segregated by gravity settling. The organic phase, i.e. p-xylene containing impurities, it lighter than the aqueous phase containing terephthalic acid and remains on the top of the vessel. The organic phase is separated, i.e. removed, from the aqueous phase by means of a dip tube that extends to the phase interface and the material is drawn off. The aqueous phase containing terephthalic acid is cooled to 100° C. and filtered in order to remove the solid terephthalic acid from water. Chemical analysis shows the impurity content of the treated terephthalic acid to be 0.80 percent for one stage extraction.

EXAMPLE 2

The procedure described above in example 1 is repeated but extracting the crude terephthalic acid with p-xylene five times instead of once and the impurity content of the resulting acid is only 0.11 percent.

EXAMPLE 3

The procedure described above in example 1 is repeated except 40 milliliters of butyl acetate are used in place of p-xylene and similar results are obtained.

EXAMPLE 4

The procedure described in example 1 is repeated using a series, i.e. five, of conventional mixers and settlers for extracting aldehydic impurities, rather than a single vessel, and the aldehydic impurity content of terephthalic acid was about 0.10 percent.

EXAMPLE 5

The procedure described in example 1 is repeated using a series of five conventional mixers and settlers, and 35 milliliters of chlorobenzene are used in place of p-xylene and the aldehydic impurity of the terephthalic acid was about 0.15 percent.

EXAMPLE 6

The procedure described in example 1 is repeated except 35 milliliters of chloroform are used in place of p-xylene and similar results are obtained.

EXAMPLE 7

The procedure described in example 1 is repeated using a series of five conventional mixers and settlers, and 35 milliliters of nitrobenzene are used in place of p-xylene and the aldehydic impurity of the terephthalic acid was about 0.11 percent.

EXAMPLE 8

The procedure described in example 1 is repeated except 50 milliliters of mixed xylene isomers are used in place of p-xylene and similar results are obtained.

I claim:

1. A process for the liquid-liquid purification of crude terephthalic acid containing impurities including p-tolualdehyde and p-formylbenzoic acid which comprises:
   a. contacting an aqueous solution of crude terephthalic acid containing a weight ratio of acid to water of about from 1:1 to 1:60 with a water-immiscible liquid organic extractant inert to terephthalic acid at a temperature within the range of about from 200° to 320° C. thereby forming a two-phase system of an aqueous phase containing terephthalic acid, and an organic phase containing impurities extracted from the aqueous solution of crude terephthalic acid, said extractant added in an amount sufficient to produce a ratio of aqueous phase to organic phase of from 1:0.5 to 1:20,
   b. segregating the organic phase containing impurities from the aqueous phase containing terephthalic acid, and
   c. recovering purified terephthalic acid from the aqueous phase.

2. A process of claim 1 wherein the extractant is an aromatic hydrocarbon.

3. The process of claim 2 wherein the aromatic hydrocarbon is p-xylene.

4. A process of claim 3 wherein the weight ratio of terephthalic acid to water is from 1:2 to 1:10.

5. A process of claim 4 wherein the weight ratio of the aqueous phase to the organic phase is 1:1 to 1:5.

6. A process of claim 5 wherein the pressure employed during extracting is slightly above about autogenous.

7. A process of claim 6 wherein the aqueous phase is segregated from the organic phase by gravitational settling.

8. A process of claim 6 wherein the crude terephthalic acid is contacted with p-xylene in a countercurrent extracting system.

* * * * *

PO-1050
(5/69)

UNITED STATES PATENT OFFICE
CERTIFICATE OF CORRECTION

Patent No. 3,624,145          Dated Nov. 30, 1971

Inventor(s) Marvin S. Brinn

It is certified that error appears in the above-identified patent and that said Letters Patent are hereby corrected as shown below:

Cover page, after "[22] Filed Feb. 17, 1969" add

--[45] Patented Nov. 30, 1971--

Signed and sealed this 13th day of June 1972.

(SEAL)
Attest:

EDWARD M. FLETCHER, JR.          ROBERT GOTTSCHALK
Attesting Officer          Commissioner of Patents